(12) United States Patent
Hillebrand et al.

(10) Patent No.: US 6,730,864 B2
(45) Date of Patent: May 4, 2004

(54) SENSOR ARRANGEMENT FOR DETERMINING SELECTOR DRUM POSITION

(75) Inventors: Georg Hillebrand, Roesrath (DE); Stephan Bungart, Remscheid (DE)

(73) Assignee: Getrag Ford Transmission GmbH (GB)

( * ) Notice: Subject to any disclaimer, the term of this patent is extended or adjusted under 35 U.S.C. 154(b) by 0 days.

(21) Appl. No.: 10/249,186

(22) Filed: Mar. 20, 2003

(65) Prior Publication Data

US 2003/0184428 A1 Oct. 2, 2003

(30) Foreign Application Priority Data

Mar. 26, 2002 (EP) .............................................. 02100293

(51) Int. Cl.$^7$ ................................................. H01H 9/06
(52) U.S. Cl. .................................. 200/61.88; 200/61.54
(58) Field of Search ........................ 200/61.88, 61.54; 335/205–207; 338/32 R, 32 H

(56) References Cited

U.S. PATENT DOCUMENTS

| 4,296,394 A | * | 10/1981 | Ragheb | ........................ | 335/207 |
| 5,304,981 A | * | 4/1994 | Leising et al. | ............... | 340/456 |
| 6,225,582 B1 | * | 5/2001 | Stadler et al. | ........... | 200/61.27 |

FOREIGN PATENT DOCUMENTS

| DE | 19920440 A1 | 11/2000 |
| DE | 19929632 A1 | 1/2001 |
| DE | 4314952 C2 | 6/2002 |
| EP | 10094253 A2 | 4/2001 |

* cited by examiner

Primary Examiner—Anh Mai
Assistant Examiner—Lisa Klaus
(74) Attorney, Agent, or Firm—David B. Kelley

(57) ABSTRACT

A sensor arrangement (10) for determining the selector drum position of a selector drum, in particular of a transmission controller, having a sensor disc (11) that is operatively connected to the selector drum and identifies different selector states by means of a running track (14), and a sensing device (12) that continuously senses the running track (14) in order to register the position data from the running track (14) which identifies the switching states.

11 Claims, 2 Drawing Sheets

SENSOR ARRANGEMENT FOR DETERMINING SELECTOR DRUM POSITION

BACKGROUND OF THE INVENTION

1. Field of the Invention

The invention relates to a sensor assembly for producing a signal representing the angular position of a selector disc about an axis.

2. Description of the Prior Art

The prior art discloses various sensor arrangements for determining the selector position, in particular of a transmission controller. For example, DE 199 29 632 A1 discloses an apparatus for registering the position of the movements of two axles, in particular the selector position of a transmission controller, in which at least one cam track is formed on a shaft, along which track an extension of a sensing lever slides. Movement of the extension is converted into an output signal with the aid of a sensor. In this case, as viewed in the axial direction of the shaft, on both sides of a first cam track having a surface running in a circle there are a second and a third cam track, these each having sections with a different design one behind the other, as viewed in the circumferential direction of the shaft. In this case, a sensing lever is pressed onto the outer face of the cam by a spring element, the lever having a spherical tip. Via this sensing lever, during the movement of the shaft in the axial direction and in the rotational direction, these two movements are continuously tracked by the sensing lever with its tip and, in this way, the selector position is determined. The disadvantage here is that the apparatus has a geometric track, which is difficult to fabricate. Since the shaft also executes a movement in the axial direction, the sensing lever has to be mounted in a complicated manner.

Furthermore, DE 199 20 440 A1 discloses a multi-step transmission for a motor vehicle having a plurality of wheel sets corresponding to a plurality of gears and having a rotatable selector drum which has at least one circumferential groove, in which an axially displaceable guide element is guided, and is coupled to means for engaging and disengaging at least one of the gears. In this case, a further rotatable selector drum is provided, having at least one further circumferential groove in which a further axially displaceable guide element is guided, and is coupled to means for engaging and disengaging at least one other of the gears. In this arrangement, the control and actuation for the selector drums can have a different configuration. For example, cam discs can be provided, which are connected to the selector drums with a force fit or form fit or are formed integrally. Here, the circumference of the cam discs can be provided with a larger radius in angular regions corresponding to the selector positions of one of the gears rather than in the angular regions corresponding to the neutral selector positions. The cam discs, in this case, comprise radially projecting angular regions, which correspond to the selector positions of the gears, and radially setback angular regions, which correspond to the neutral selector positions. In this arrangement, the very accurate and variable control and actuation of the respective selector position is likewise advantageous, but the disadvantage here is that this apparatus does not permit the selector position to be determined merely from the position of the cam disc.

EP 1 094 253 A2 discloses a selector arrangement having a control device in which the various shaft positions of the input and output shafts of a step-up transmission are registered by means of various sensor elements and are further processed by an electronic controller. In this case, the design of the arrangement is used in particular to reduce weight and to increase reliability.

DE 43 14 952 A1 discloses an apparatus for registering the gear position of a multi-step transmission whose transmission steps can be selected by a selector shaft, which is mounted such that it can be rotated about its axis and also displaced in the direction of its axis in a housing of the multi-step transmission using digital selector elements. In this case, a combination of digital and analog selector elements is provided, in such a way that digital selector elements are provided to register the aisles, and analog selector elements are provided to register the gears. The analog selector element can have different designs, for example, it can be designed as a rotational angle sensor or else as a travel sensor.

SUMMARY OF INVENTION

On the basis of these known sensor arrangements for determining the selector position, in particular of a transmission controller, this invention provides a sensor arrangement which has a simpler construction than the known sensor arrangements.

According to the invention, a running track has, at least to some extent, regions for gear positions, neutral positions and selector sections. A selector section is arranged between a gear position and a neutral position. The position data registered by the sensing device and belonging to gear positions and neutral positions is different from the position data belonging to the selector sections. The position data of the selector sections, which are directly adjacent to a gear position or a neutral position, are different from one another.

In this way, the possibility is provided for the sensor disc not only to detect the individual selector positions, viz., the gear positions G, the neutral positions N and any desired reference neutral step nN as a detent point, but also simultaneously, via the regions between the selector sections NG and GN, on the basis of the sensor position and the direction of rotation, to detect whether the next selector position is neutral or a gear. The combined registration of the position data via a single sensor disc, without axial displacement of sensing device or sensor disc, leads to a considerable simplification of the production of the sensor arrangement and makes it possible to use simpler sensor elements. Nevertheless, the arrangement makes it possible to determine the selector position and to monitor the selector drum.

In an advantageous refinement of the invention, the running track has a detent groove and at least one gear position or neutral position, and the sensing device is pressed onto the running track by means of a suitable element. The functionality of the sensor arrangement comprising the sensor disc and sensing system is therefore expanded by the function of a mechanical detent system, such as is used in a manual multi-step transmission. The sensing head interacting with the running track latches into the gear or neutral selector positions by pressing the sensing device onto the running track.

In a further inventive embodiment, the running track has variable position data in the region of a selector section. This can mean, for example, that the selector section is of ramp-like design with respect to the position data to be measured, by which means the position data can be assigned a unique position of the sensor disc. Individual selector sections can have the respectively identical variable position data, or else each selector section has its own singular position data. Any combination is also possible, for example, some of the selector sections can have the same course of the position data, and some others a different course of the position data.

The running track advantageously has different position data between the selector positions of gear positions and the selector positions of neutral positions. It is therefore possible to detect immediately whether a gear is selected or whether the transmission is in neutral.

Furthermore, the running track can have different position data at least for individual gear positions. The gear engaged can therefore be determined immediately from the position data.

Furthermore, the running track can have different position data at least for individual neutral positions. Therefore, the gears, between which the selector drum is in neutral, can be determined immediately from the position data. This is necessary in particular for a reference neutral. There is a reference neutral position, for example between a forward gear and a reverse gear, which has its own position data enabling immediate detection. One use for this is the neutral position of the transmission, for example when starting a motor, when no selection has yet been made. The first selection is then carried out from this position.

In a preferred embodiment, the sensor disc has different diameters along its running track in order to produce different position data in the radial direction. This corresponds to a running track arranged in the circumference of the sensor disc, which is sensed predominantly in the radial direction by the sensing device. The circumferential changes are registered as position data and can be assigned appropriately to the sensor disc position.

In a further embodiment, the sensor disc has a running track which, as viewed in the axial direction of the sensor disc axis, is not flat, in order to produce different position data in the axial direction. This corresponds to an arrangement of the sensing device in the axial direction. The sensing system registers the axial unevenness at the end of the sensor disc and assigns this position data to a sensor disc position. Of course, a combination of axial position data determination and radial position data determination, as described in the previous paragraph, is also possible. However, at least two sensing devices are then expediently used.

In a further preferred embodiment, the sensing device has a rotatably mounted ball in order to sense the running track of the sensor disc. The ball, as a sensing head, reduces friction between the sensing device and running track, which permits reliable selection and accurate measurement in the region of the detent grooves. In principle, however, the sensing device can have any known sensing head for sensing surfaces, and is therefore not restricted to a ball as sensing head.

The sensing device preferably has a sensor designed as a Hall element. As a result, movement of the sensing device resulting from the change in the position data can be used to determine the relative displacement and therefore the position data very accurately. In the case of the sensor designed as a Hall element, it is primarily a linear displacement of the sensing device that is measured. Any other displacement or rotation of the sensing device can also be used to determine the position data and can be registered by means of suitable sensors.

BRIEF DESCRIPTION OF DRAWINGS

Further advantageous refinements of the invention can be seen from the drawings, in which.

DETAILED DESCRIPTION

Figure 1:
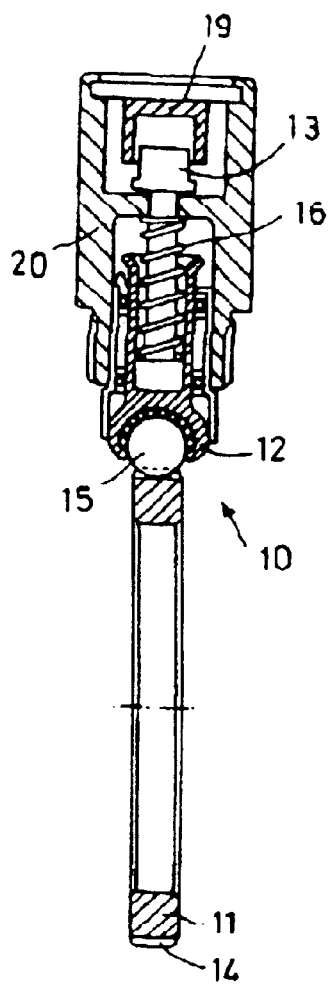
FIG. 1 is a front cross sectional view of a first embodiment of the sensor arrangement according to the invention.

A sensor arrangement 10 according to the invention is illustrated in FIG. 1. The sensor arrangement 10 has a sensor disc 11, which is operatively connected to the selector drum (not shown) in a manner know to those skilled in the art, and carries bears the running track 14. The sensor arrangement 10 also has a spring-loaded sensing device 12, which contacts the running track 14 of the sensor disc 11 continuously, and a rotatably mounted ball 15 running directly on the running track 14.

The sensing device 12 is displaceably mounted in a housing 20, fixed firmly to a transmission (not illustrated) the direction of movement predominantly being oriented in the radial direction of the sensor disc 11. A compression spring 16 has one end mounted in the sensing housing 20, and its other end urging the sensing device 12 and the ball 15 onto the running track 14. Arranged on the sensing device, at the end opposite the ball 15, is a magnet 13, which is part of the sensor 19, designed as a Hall-effect sensor. The sensor 19 registers position data from the sensing device 12 and converts the data into an electrical signal.

Figure 2:
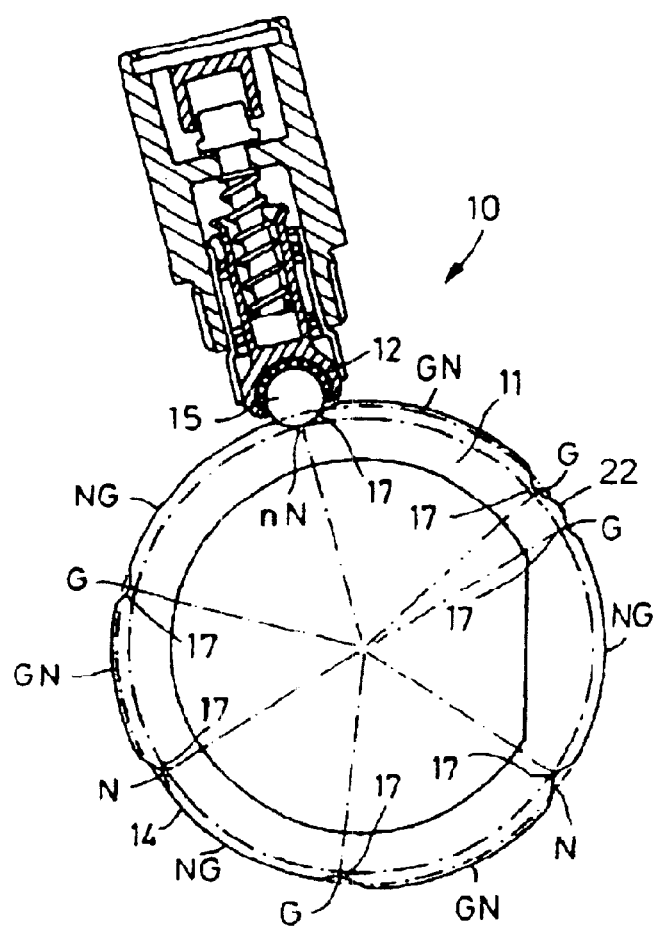
FIG. 2 is a side cross sectional view of the first embodiment of FIG. 1.

FIG. 2 is the cross-sectional view of the sensor arrangement according to the invention. Along the running track 14, the sensor disc 11 is designed for the combined registration of position data referred to selector sections GN, NG of the selector drum, and of position data related to precise selector positions G, N, nN of the selector drum, wherein:

N: means the neutral position, a selector position in which the transmission is in neutral;

nN: means the reference neutral position, a specific, unique selector position in which the transmission is in neutral, used as a reference, preferably arranged between a forward gear position and a reverse gear position;

G: is a gear position, selector position when one gear in the transmission is engaged, for example reverse gear, first, second or third gear, and so on;

NG: is a selector section between a neutral position N and a selector position G, the neutral position N being reached only in a first direction of rotation of the selector drum, the gear position G, on the other hand, in a second, opposite direction of rotation;

GN: is a selector section between a neutral position N and a selector position G, the neutral position Nopposed to NGbeing reached only in the second direction of rotation of the selector drum, and the gear position G, on the other hand, in the first, opposite direction of rotation.

For the purpose of combined registration of the different position data between the selector sections NG and GN, the sensor disc 11 has different radii. The selector positions G, N and nN, which are designed as selector grooves, likewise have different radii in each case, which likewise differ from the radii of the selector sections NG and GN. By evaluating the position signal from the sensor 19, the instantaneous position of the sensor disc 11 is detected. Furthermore, it is possible to derive from the position signal whether a neutral position or a gear position follows in the direction of rotation, since, depending on NG or GN, only G or N or nN can follow as the next selector position in the direction of rotation. Conversely, on the basis of the evaluation during the movement from a selector position G, N or nN, the direction of rotation of the selector drum can be determined, since in one direction of rotation from G, for example, NG must always follow, but then from N, GN must always follow.

In the region 22 of the sensing track 14 there is neither a selector section GN nor NG. In operation, the region 22 is virtually not passed through, since in this example the selector drum only executes a rotation of less than 360°. The two gear positions G adjacent to the region 22, therefore, in each case represent the two end positions of the selector drum rotation.

In a further refinement of the invention, the detent positions of G and N also have radii different from one another, so that it is also possible, for example, for the first gear step, the third gear step, neutral between first and second gear, and so on to be detected directly.

In the region of the detent grooves at the gear positions G and the neutral positions N, the sensor disc 11 has subregions 17, which are set back radially and shaped like a concave circular arc. As a result, the individual selector positions G, N on the sensor disc 11 are defined exactly, which is important for the measurement of the position data with high precision in the individual selector positions G, N, since the selector drum connected to this sensor disc is held mechanically in position and latched by the spring-loaded sensing device 12 by means of the ball 15. This achieves reliable, reproducible latching in the selector positions.

Figure 3:
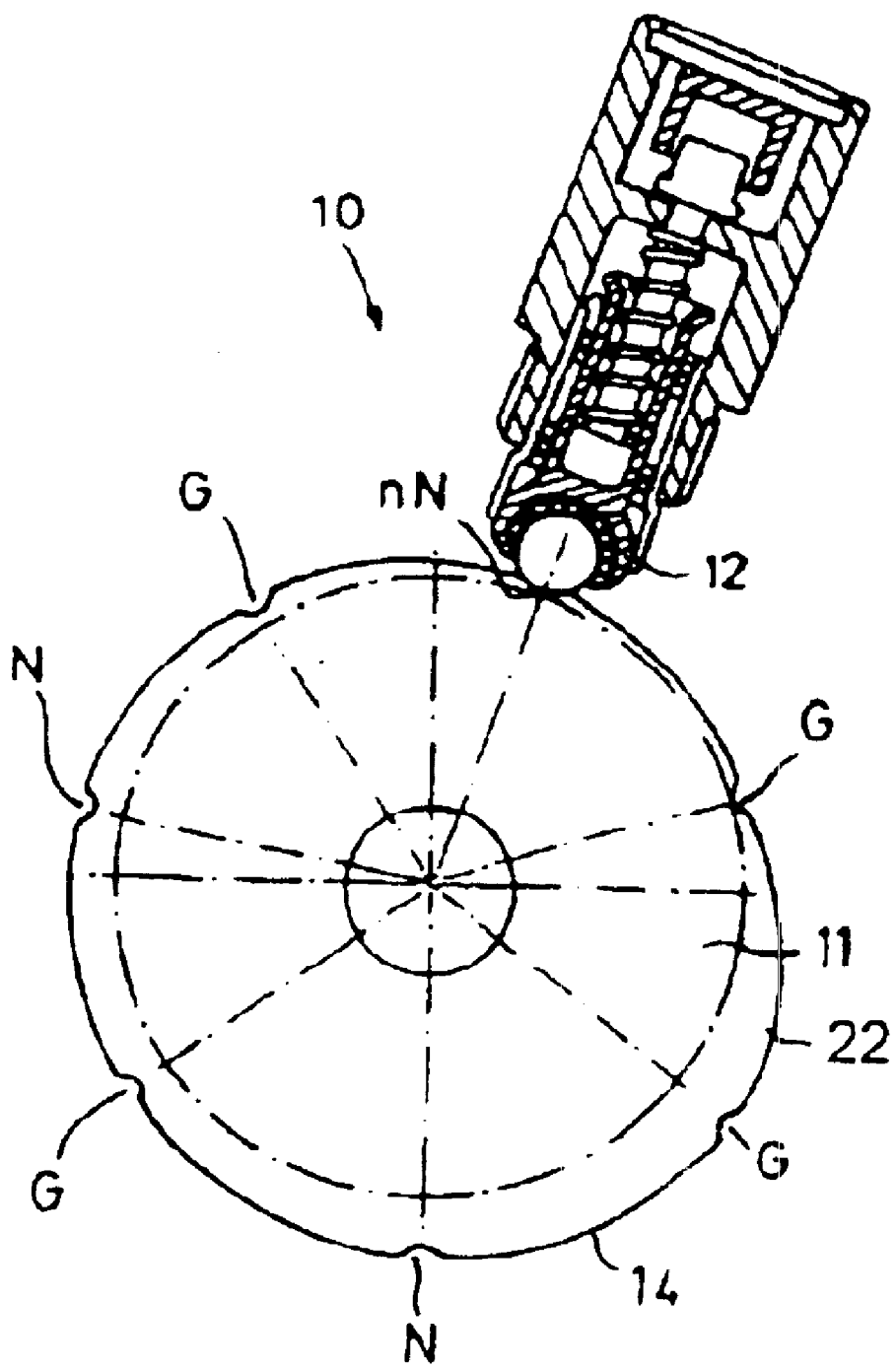
FIG. 3 is a side cross sectional view of a second embodiment of the sensor arrangement according to the invention.

FIG. 3 illustrates a similar sensor arrangement 10 to that in FIG. 1, except that the sensor disc 11 differs with respect to the diameter on the running track 14. In the regions between nN, N and G, the running track 14 has a variable radius running like a ramp, it being possible for the angular change in the radius to be associated with a specific angle of the selector drum. The individual detent points at the gear positions G and N can likewise be associated with singular radii. Thus, the association with specific gear positions C, for example reverse, first, second or third gear, and various neutral positions lying in between can be reached. Here, too, the region 22, as already described in FIG. 2, is not passed through in practical operation, and therefore the position data there is not used.

As already mentioned, the embodiments illustrated are only examples of implementations of the invention. The invention is not restricted to the examples shown, instead still further modifications and embodiments are possible. For example, in particular modifications to the sensor disc 11 for the combined registration of different position data in the radial and axial direction are conceivable.

What is claimed:

1. A sensor assembly for producing a signal representing multiple selector states, comprising:

a disc mounted for rotation about an axis, the disc including a running track extending angularly about said axis, having on the running track mutually spaced gear positions and neutral positions, and selector sections located angularly between a gear position and a neutral position, each gear position, neutral position and selector section being associated with a selector state and being spaced radially from said axis at respective predetermined distances; and a sensor that continuously contacts the running track and produces a signal representing the radial distance of the gear positions, neutral positions, and selector sections from said axis as the disc rotates.

2. The assembly of claim 1, wherein the radial distance of the running track from said axis at the gear position and the neutral position is different from the radial distance of the running track from said axis at the selector section.

3. The assembly as claimed in claim 2, wherein the sensor device further comprises a rotatably mounted ball urged by "a spring" into contact with the running track.

4. The sensor assembly as claimed in claim 2, wherein the sensor is a Hall-effect sensor.

5. The assembly of claim 1, wherein a first selector section and a second selector section located adjacent and on opposite angular sides of the gear position or neutral position being at unequal radial distances on the running track from said axis.

6. The assembly as claimed in claim 1, wherein:

the running track includes a first detent groove located at the gear position and a second detent groove located at the neutral position; and the sensor further comprises a sensor device and a spring that urging the sensing device into contact with the running track.

7. The assembly as claimed in claim 1, wherein the radial distance of the running track from said axis at a selector section is angularly variable within the selector section.

8. The assembly as claimed in claim 1, wherein the dial distance of the running track from said axis at the gear positions is different than the radial distance of the running track from said axis at the neutral positions.

9. The assembly as claimed in claim 1, wherein the radial distance of the running track from said axis at each gear position is different than the radial distance of the running track from said axis at any other gear position.

10. The assembly as claimed in claim 1, wherein the radial distance of the running track from said axis at each neutral position is different than the radial distance of the running track from said axis at any other neutral position.

11. The assembly as claimed in claim 1, wherein the radial distance of the running track from said axis varies continually along the running track.

* * * * *